US012749416B2

(12) United States Patent
Haack et al.

(10) Patent No.: US 12,749,416 B2
(45) Date of Patent: Sep. 29, 2026

(54) UTILITY ACCESS BOX LID LABELING SYSTEM AND METHODS

(71) Applicant: Jensen Enterprises, Inc., Reno, NV (US)

(72) Inventors: Tyler Haack, Reno, NV (US); Jon Reed, Oakdale, CA (US); Ryan Black, Henderson, NV (US); Bryan Bach, Reno, NV (US); Morgan Baumann, Las Vegas, NV (US); Richard Miller, Auburn, CA (US)

(73) Assignee: Jensen Enterprises, Inc., Reno, NV (US)

( * ) Notice: Subject to any disclaimer, the term of this patent is extended or adjusted under 35 U.S.C. 154(b) by 201 days.

(21) Appl. No.: 18/629,535

(22) Filed: Apr. 8, 2024

(65) Prior Publication Data

US 2024/0346959 A1 Oct. 17, 2024

Related U.S. Application Data

(60) Provisional application No. 63/458,586, filed on Apr. 11, 2023.

(51) Int. Cl.
*G09F 3/16* (2006.01)
*H02B 1/46* (2006.01)

(52) U.S. Cl.
CPC *G09F 3/16* (2013.01); *H02B 1/46* (2013.01)

(58) Field of Classification Search
CPC .................................... G09F 3/16; H02B 1/46
See application file for complete search history.

(56) References Cited

U.S. PATENT DOCUMENTS

| | | | | |
|---|---|---|---|---|
| 4,253,629 | A * | 3/1981 | Wilmes | G09F 3/00 248/68.1 |
| 5,613,874 | A * | 3/1997 | Orlando | H01R 13/465 40/607.13 |
| 7,740,282 | B2 * | 6/2010 | McNutt | H04Q 1/136 283/117 |
| D682,553 | S | 5/2013 | Jurich et al. | |
| 8,827,589 | B2 * | 9/2014 | Jurich | E02D 29/14 404/25 |
| 9,890,566 | B1 * | 2/2018 | Davidson | H02G 9/10 |
| 2004/0187373 | A1 * | 9/2004 | Zappacosta | G09F 3/16 40/667 |
| 2007/0222691 | A1 * | 9/2007 | Lee | H01Q 1/44 343/718 |
| 2015/0040447 | A1 * | 2/2015 | Ganster | H01R 9/2683 40/647 |
| 2016/0276779 | A1 * | 9/2016 | Lipke | G09F 3/16 |

* cited by examiner

*Primary Examiner* — Gary C Hoge
(74) *Attorney, Agent, or Firm* — Weintraub Tobin; Audrey A. Millemann

(57) ABSTRACT

A system and method for labeling lids for utility access boxes using a receiver cast into the lid where the receiver has receiving slots with snap tabs for receiving cantilever arms on a name plate to affix the nameplate to the lid of the utility access box. Alternatively, receiving slots with snap tabs can be integrated in the lid for receiving cantilever arms on a nameplate to affix the nameplate to the lid of the utility access box without the need for a separate receiver.

5 Claims, 8 Drawing Sheets

UTILITY ACCESS BOX LID LABELING SYSTEM AND METHODS

CROSS-REFERENCE TO RELATED APPLICATION

This application claims priority under 35 U.S.C. Section 119 (e) to co-pending U.S. Provisional Patent Application No. 63/458,586 entitled "Utility Access Box Lid Labeling System and Methods" filed on Apr. 11, 2023, the entire disclosure of which is incorporated herein by reference.

FIELD

The present invention pertains generally to lids for utility access boxes, and more particularly to lids for utility access boxes with affixed nameplates and to methods for affixing nameplates to lids for utility access boxes.

BACKGROUND

Underground utility boxes have many useful applications that require accessing the box from grade level. To identify the type of installation, utility boxes are typically labeled according to their use, such as water, electric, communications, and gas. A variety of methods have been used to label utility boxes, including embossing or debossing directly on the lid of the utility box or by affixing a nameplate to the lid of the utility box.

Prior systems and methods using embossing and debossing of lids for utility access boxes require the users and others in the supply chain, such as manufacturers and distributors, to carefully plan and carry inventory for a large number of different lids with different labels to meet the market demand for lids with specific labels. Having sufficient inventory of lids with the right label at the right time is challenging.

To solve the inventory issues, existing systems provide nameplates that are either glued to a lid of a utility box or fastened to a lid of a utility box using screws or bolts. This approach requires maintaining an inventory of the various nameplates rather than an inventory of different, specifically labeled lids.

Nameplates that are screwed or bolted into place require installation labor and care to ensure the product is properly installed. Nameplates that are screwed or bolted in place are also at risk of coming loose during normal wear and tear.

Nameplates that are glued into place, however, may delaminate or detach with the passage of time and depending on the weather conditions. Nameplates affixed with glue or other adhesive are also easily removed and do not stay in place.

In one prior system, the nameplate is attached before casting, uses a round pin with a friction fit. The concrete or other material is then cast around the nameplate. In these systems, the nameplate is essentially permanently attached and must be cast in place at the time of manufacture rather than later by the customer or other user during or after installation of the utility box.

Hence, there is a need to ameliorate or overcome one or more of these significant shortcomings.

SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

Accordingly, and in one aspect, an embodiment of the present invention ameliorates or overcomes one or more of the shortcomings of the known prior art by providing a nameplate system and method for labeling lids for utility access boxes comprising a receiver and a nameplate with a plurality of cantilever arms to affix the nameplate to the receiver in the lid for a utility access box.

The nameplate comprises a plurality of cantilever arms that each clip past a snap tab in a receiving slot to lock the nameplate in the lid for a utility access box to affix the nameplate to the lid.

In one embodiment, the receiver is cast into the lid wherein the receiver comprises a plurality of receiving slots for affixing the nameplate.

In one embodiment, the nameplate is an injection molded part with a plurality of cantilever arms integrated with the nameplate.

In one embodiment, the receiver is an injection molded part with a plurality of receiving slots wherein each of the plurality of receiving slots can receiving one of a plurality of cantilever arms on the nameplate.

In one embodiment, the lid is made from concrete.

In another embodiment, the lid is made from polymer concrete.

In another embodiment, a plurality of integrated receiving slots for receiving a nameplate are formed directly in a lid for a utility access box at the time of manufacture of the lid, eliminating the need for a separate receiver.

This invention eliminates the need for separate fasteners, such as screws, bolts, glue, or other adhesives, to attach the nameplate to the lid for a utility access box.

The nameplate is simple to install for the end user.

The nameplate is durable and difficult to remove when installed, making it suitable for pedestrian and vehicular traffic as well as harsh weather conditions, such as rain and freezing weather with subsequent thaws.

The nameplate snaps into place using the plurality of cantilever arms and snap tabs for a quick, secure installation of the nameplate allowing the user to gain the benefit of a labeling system that is simple, fast to install, and designed to last for the life of the product.

Further aspects of the embodiments of the present disclosure will become apparent from the detailed description provided below, when taken together with the attached drawings and claims. It should be understood, however, that numerous modifications and adaptations may be resorted to without departing from the scope and fair meaning of the claims as set forth below following the detailed description of preferred embodiments of the present disclosure.

BRIEF DESCRIPTION OF THE SEVERAL VIEWS OF THE DRAWINGS

The foregoing summary, as well as the following detailed description of the disclosure, will be more fully understood by reference to the following drawings which are for illustrative purposes only, and are not intended to limit the scope of the present disclosure. Also, it is appreciated that the drawings are not necessarily to scale as some components may be shown to be enlarged or to be out of proportion relative to the size in actual implementation in order to more clearly illustrate one or more concepts of the present disclosure. In the drawings.

DETAILED DESCRIPTION

Figure 1:
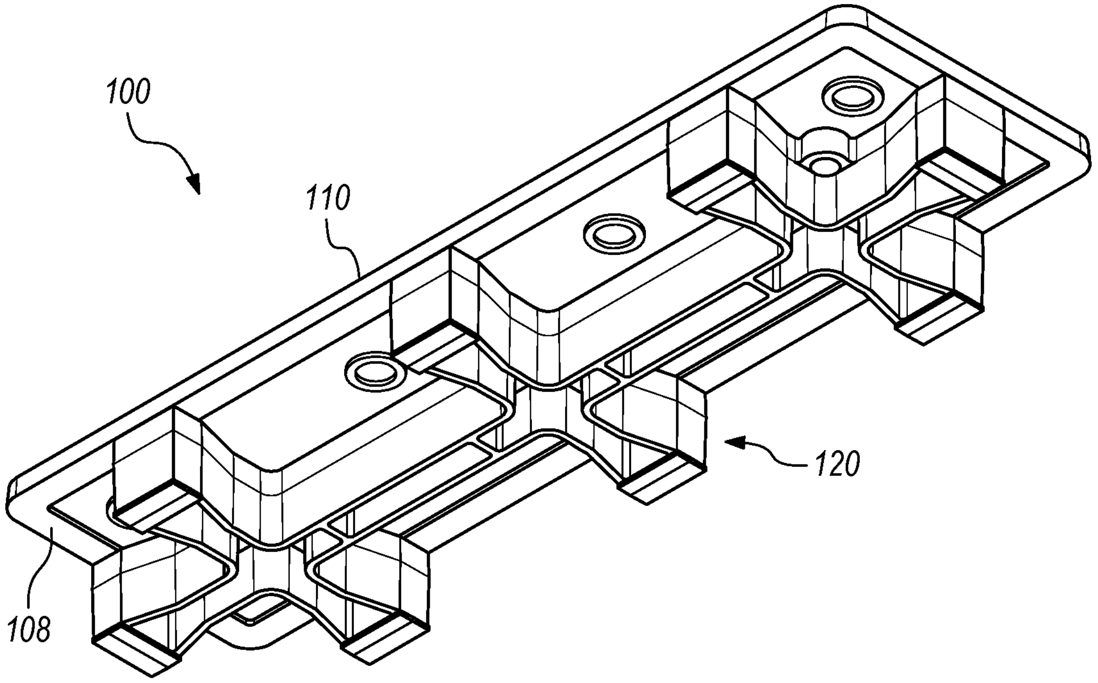
FIG. 1 is a view from below of an example embodiment of a labeling assembly of the present invention for use in a lid for a utility access box.
Figure 2:
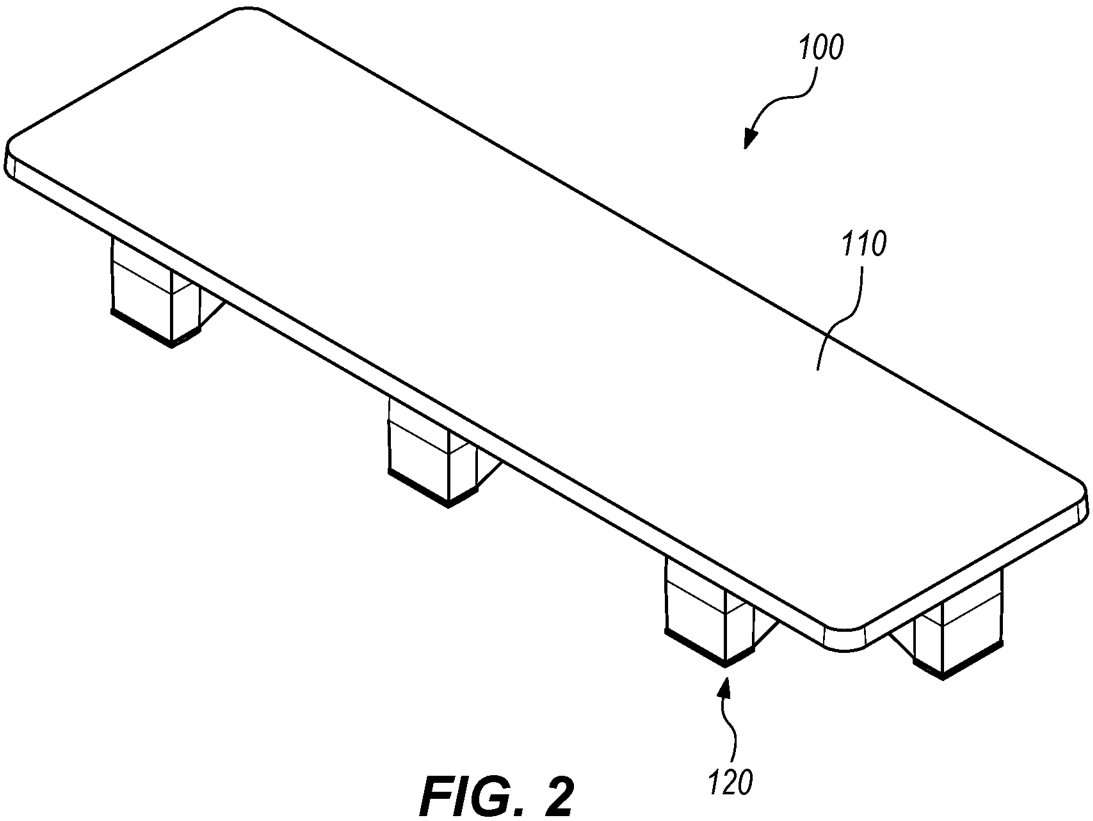
FIG. 2 is a view of from above of the example embodiment of the labeling assembly shown in FIG. 1 for use in a lid for a utility access box.
Figure 3:
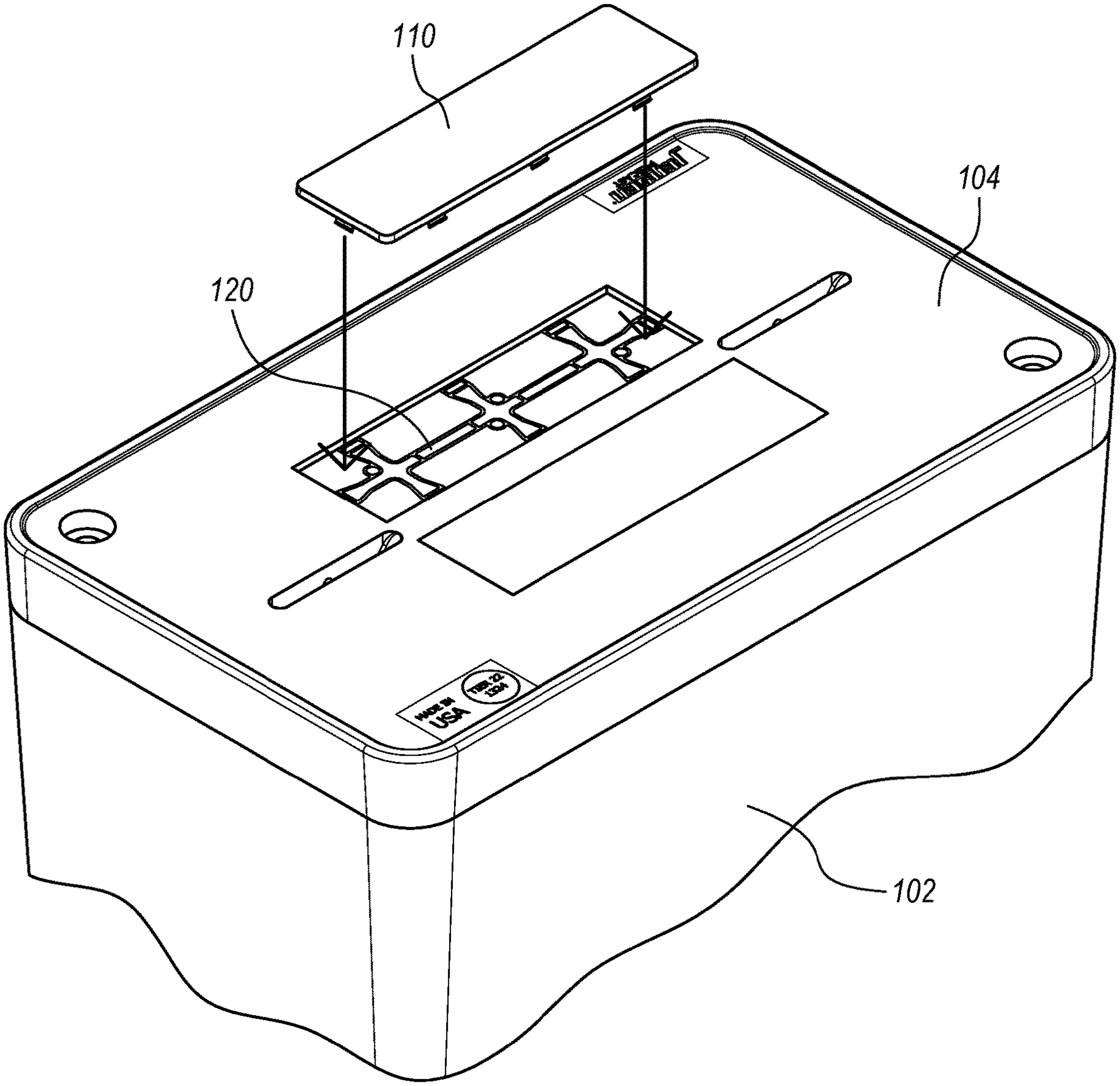
FIG. 3 shows an example embodiment of a receiver embedded in the lid for a utility box and a nameplate to snap into the receiver.

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

FIGS. 1, 2, 3, and 4 illustrate an example embodiment of a labeling assembly 100 for labeling a lid 104 of a utility access box 102. Labeling assembly 100 comprises a receiver 120 and a nameplate 110 that snaps into receiver 120. Receiver 120 is cast into lid 104 of utility access box 102.

Receiver 120 comprises a spine 180 and receiver arms 170 extending from spine 180. Each receiver arm 170 comprises a receiving slot 140 on a top side 122 of receiver 120.

Figure 4:
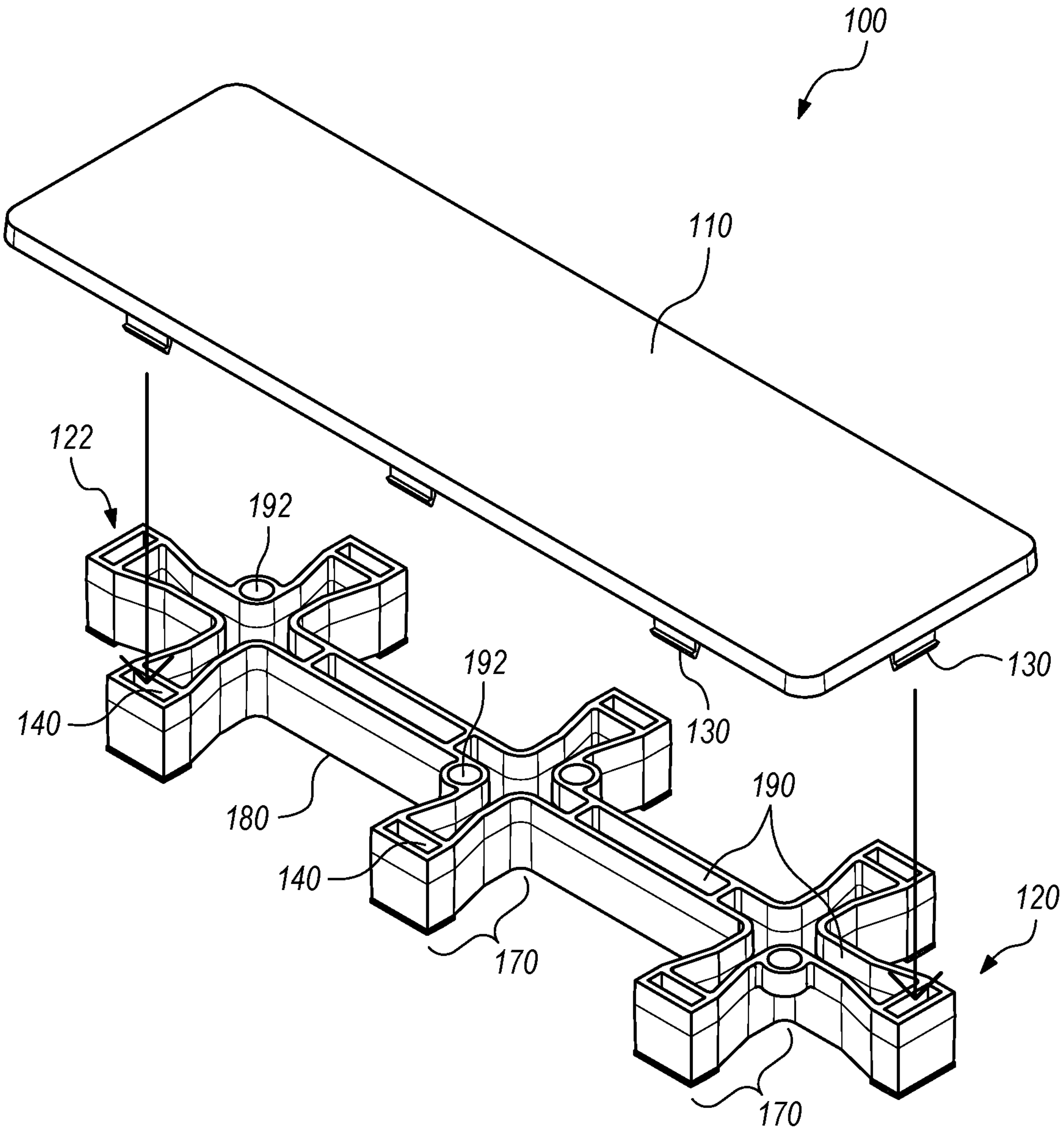
FIG. 4 shows an example embodiment of a receiver and nameplate of the present invention for use in a lid for a utility access box.
Figure 5:
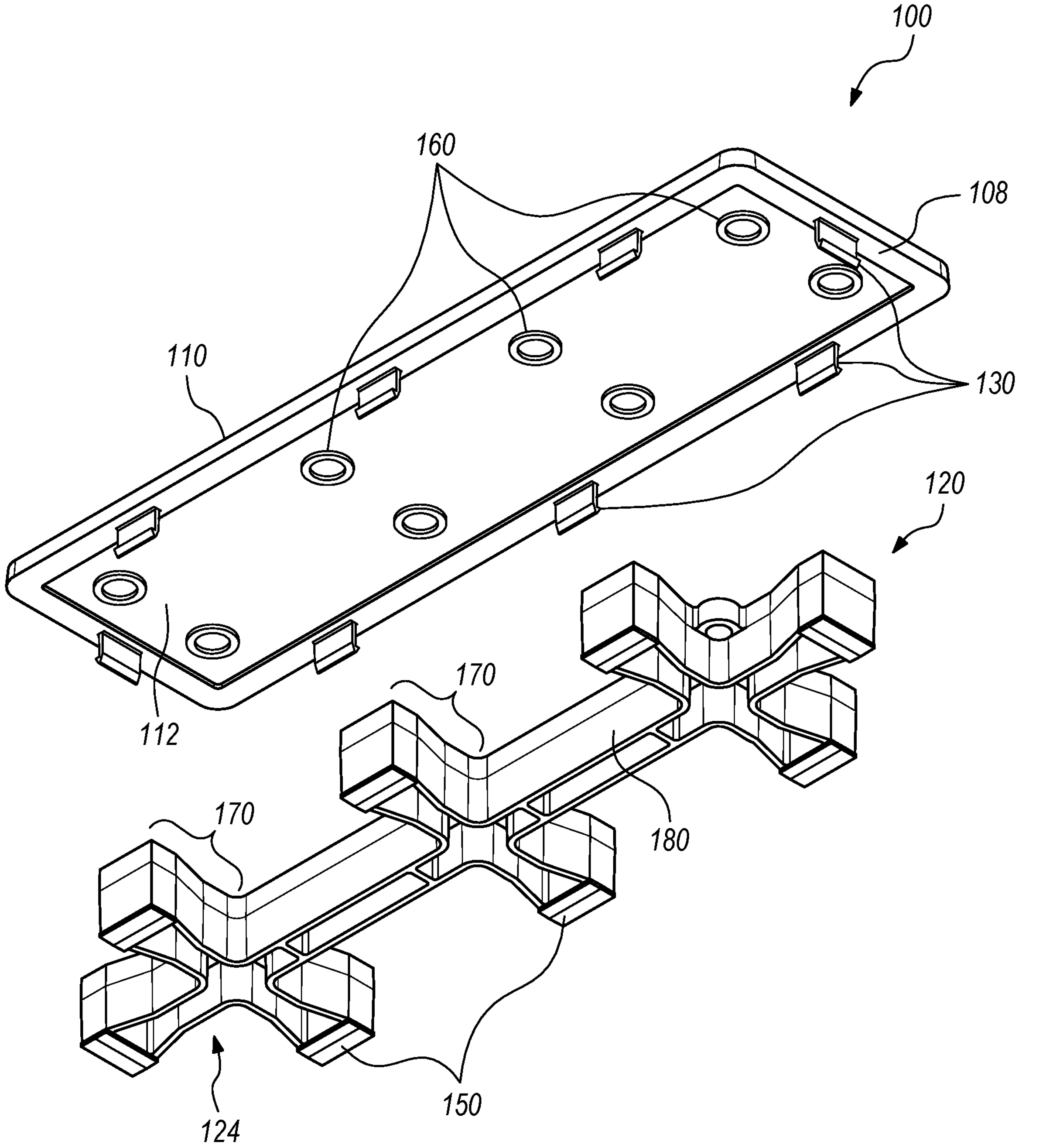
FIG. 5 is a view from below of the receiver and nameplate of FIG. 4.
Figure 9:
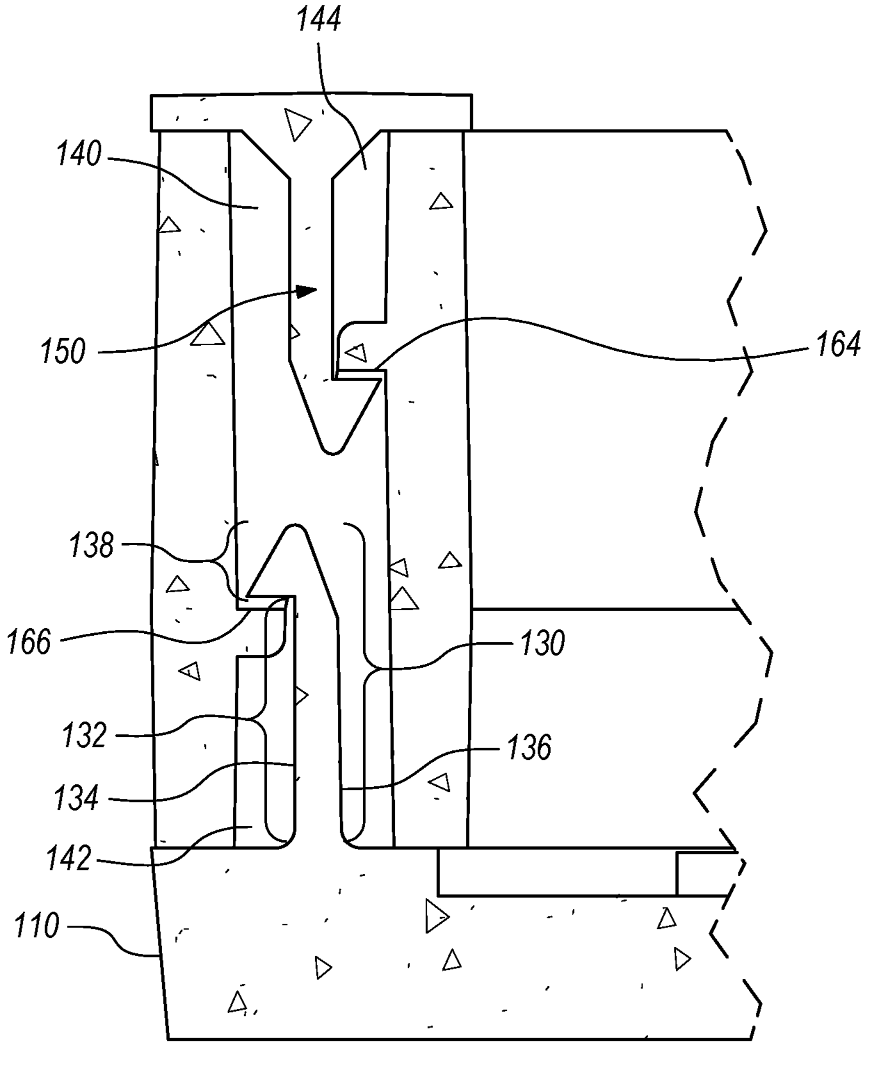
FIG. 9 shows a cross-section of an example embodiment of a receiving slot in a receiver with a cantilever arm of a nameplate inserted into one end of the receiving slot and a plug inserted into the other end of the receiving slot.

As shown in FIGS. 4, 5 and 9, nameplate 110 comprises a plurality of cantilever arms 130 and each of the plurality of cantilever arms snap or lock into one of the plurality of receiving slots 140 (FIG. 9) for affixing nameplate 110 to receiver 120. Each receiving slot 140 comprises a first receiver opening 142, a second receiver opening 144, a first snap tab 166 and a second snap tab 164. Each cantilever arm 130 comprises a finger 132 attached to nameplate 110 with a first side 134 and a second side 136. Each cantilever arm 130 further comprises a hook 138 that extends from first side 134 of finger 132 for clipping hook 138 past first snap tab 166 in first receiver opening 142 of receiving slot 140 in receiver 120 to form a cantilever snap joint.

Nameplate 110 may be affixed to receiver 120 using the plurality of cantilever arms 130 without the use of glue, adhesive, screws, bolts, or other fasteners separate from nameplate 110.

In one embodiment as shown in FIG. 5, nameplate 110 further comprises an interior portion 112, a border 108 around the perimeter of interior portion 112 of nameplate 110, and a plurality of support bosses 160 in interior portion 112 of nameplate 110. Border 108 is thicker than at least a portion of interior portion 112 of the nameplate. The plurality of support bosses 160 provide support to the middle of nameplate 110 after installation of nameplate 110 in receiver 120. The plurality of support bosses 160 allow use of thickened border 108 on nameplate 110 to strengthen nameplate 110 without having to make the entire nameplate thicker for increased strength.

Nameplate 110 can be made using materials that are resistant to ultraviolet rays. Nameplate 110 can be made using materials that are impact resistant.

In an example embodiment, nameplate 110 is made using injection molding.

In an example embodiment, nameplate 110 is made from a plastic such as polypropylene. Other materials can also be used such as other plastics (e.g., acrylonitrile butadiene styrene (ABS) and high-density polyethylene (HDPE)), synthetic or composite materials (e.g., glass-filled resin, sheet molding compound (SMC) and bulk molding compound (BMC)), or metal.

As illustrated in FIG. 4, receiver 120 further comprises a plurality of body cavities 190. Each body cavity 190 is an open area in receiver 120 that reduces the amount of material needed to form receiver 120, which reduces the cost.

In an example embodiment, receiver 120 is made using injection molding.

In an example embodiment, receiver 120 is made from a plastic such as polypropylene. In other embodiments, other materials can also be used such as plastics (e.g., acrylonitrile butadiene styrene (ABS) and high-density polyethylene (HDPE), synthetic or composite materials (i.e., glass-filled resin, sheet molding compound (SMC) and bulk molding compound (BMC)), or metal.

Labeling assembly 100 is more efficient than prior approaches because a user can snap nameplate 110 into place in receiver 120 without the need for any other materials or tools. Another advantage is that nameplate 110 is affixed permanently, or semi-permanently, such that nameplate 110 is not intended to be removed.

The presence of the plurality of body cavities 190 in receiver 120 allows the material forming lid 104 to flow inside each of the plurality of body cavities 190 and fill each of the plurality of body cavities 190 with the material to bond receiver 120 to lid 104 and to provide strength.

As illustrated in FIGS. 4 and 5, spine 180 and receiver arms 170 provide stability and ensure receiver 120 does not deform during casting so nameplate 110 will properly align with receiver 120.

Figure 6:
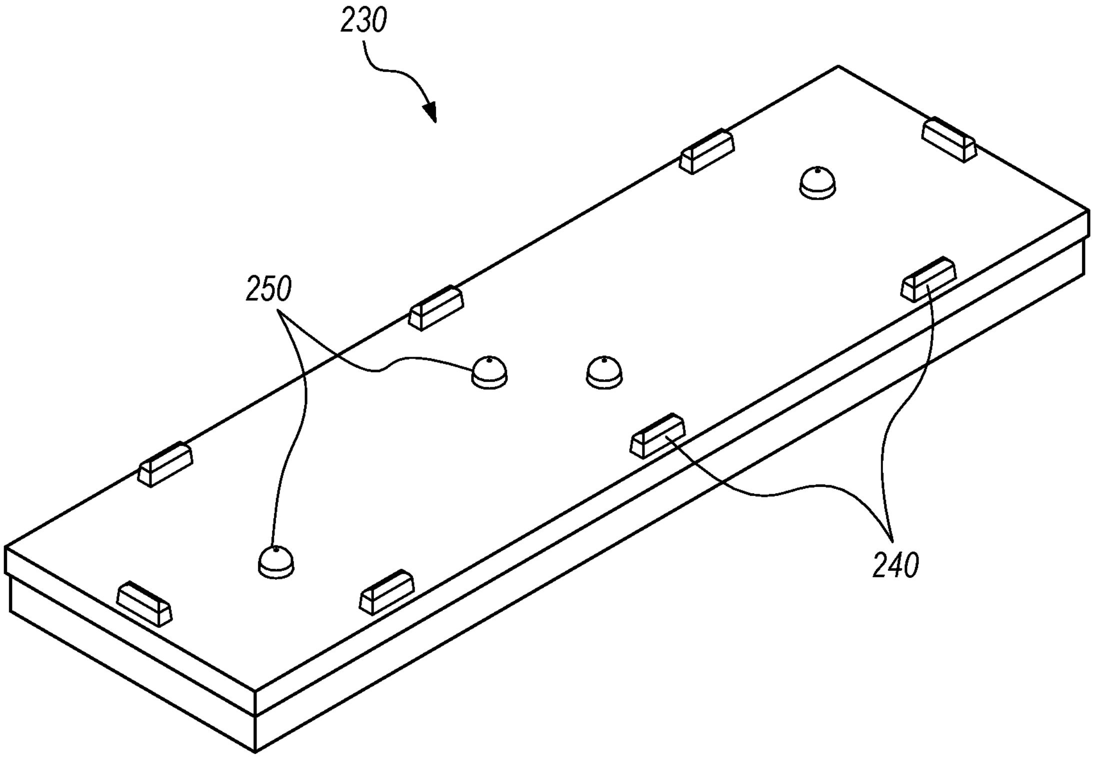
FIG. 6 shows an example embodiment of a mold for casting a lid with an embedded receiver for a nameplate.

Receiver 120 further comprises a plurality of alignment holes 192. Plurality of alignment holes 192 are used to position and secure receiver 120 into a mold 230 (FIG. 6) for casting. As shown in FIG. 6, mold 230 comprises a plurality of pins 250 to fit into plurality of alignment holes 192 of receiver 120 to hold receiver 120 in place when receiver 120 is cast into lid 104.

Mold 230 further comprises mold plugs 240.

Use of plurality of alignment holes 192 is an easy, cost-effective method to ensure receiver 120 locks into place and does not float or move during casting.

Figure 7:
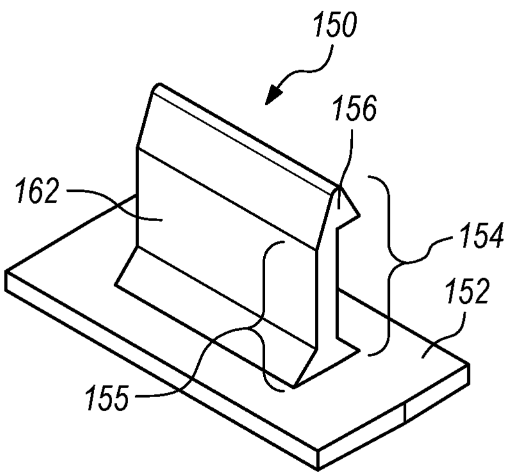
FIG. 7 shows an example embodiment of a plug for a receiver of the present invention.
Figure 8:
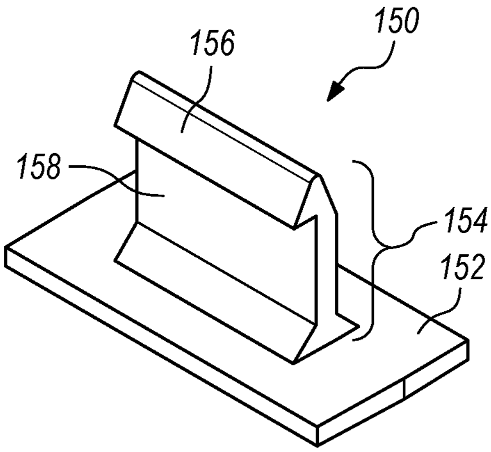
FIG. 8 shows another view of the plug of FIG. 7 for the receiver.

FIGS. 7 and 8 show a receiver plug 150, which is optional. Receiver plug 150 snaps into second receiver opening 144 (FIG. 9) in receiving slot 140 on the underside 124 (FIG. 5) of receiver 120 and covers second receiver opening 144 in receiving slot 140.

Receiver plug 150 comprises a base 152 and a plug cantilever arm 154 attached to base 152. Plug cantilever arm 154 comprises a first side 158 and a second side 162. Plug cantilever arm 154 further comprises a plug finger 155 and a plug hook 156 that extends from first side 158 of plug cantilever arm 154 for clipping hook 156 past second snap tab 164 in second receiver opening 144 of receiving slot 140 in receiver 120 such that base 152 covers second receiver opening 144.

Receiver plug 150 ensures that concrete or other material does not flow into receiving slot 140 during manufacture.

In one embodiment, receiver plug 150 is made using injection molding.

Receiver plug 150 can be made of various materials, such as rubber, silicone, foam, or other materials.

In alternate embodiments, tape, putty, or other material can be used in place of receiver plug 150 to cover second receiver opening 144.

In one embodiment, first receiver opening 142 of each receiving slot 140 is plugged during manufacturing with mold plug 240 of mold 230.

In an alternate embodiment, nameplate 110 is made using compression molding.

In an alternate embodiment, receiver 120 is made using compression molding.

Alternative Example Embodiment

Figure 10:
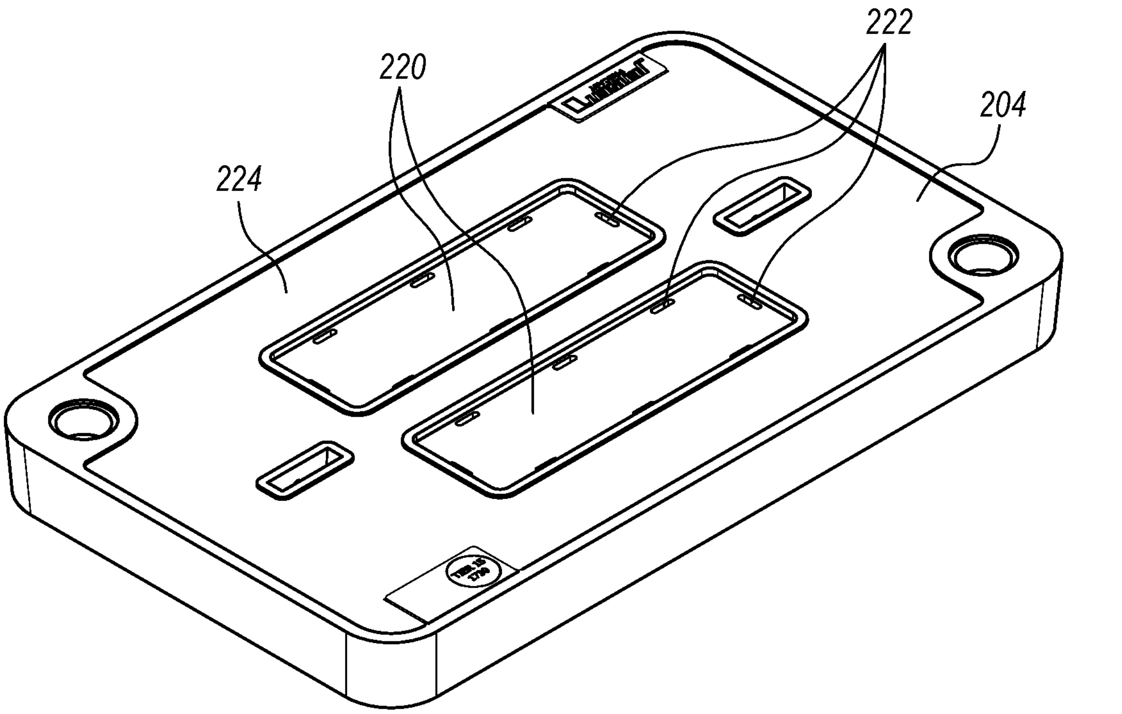
FIG. 10 shows a top view of an alternative embodiment of a lid with a plurality of integrated receiving slots for receiving a nameplate.
Figure 11:
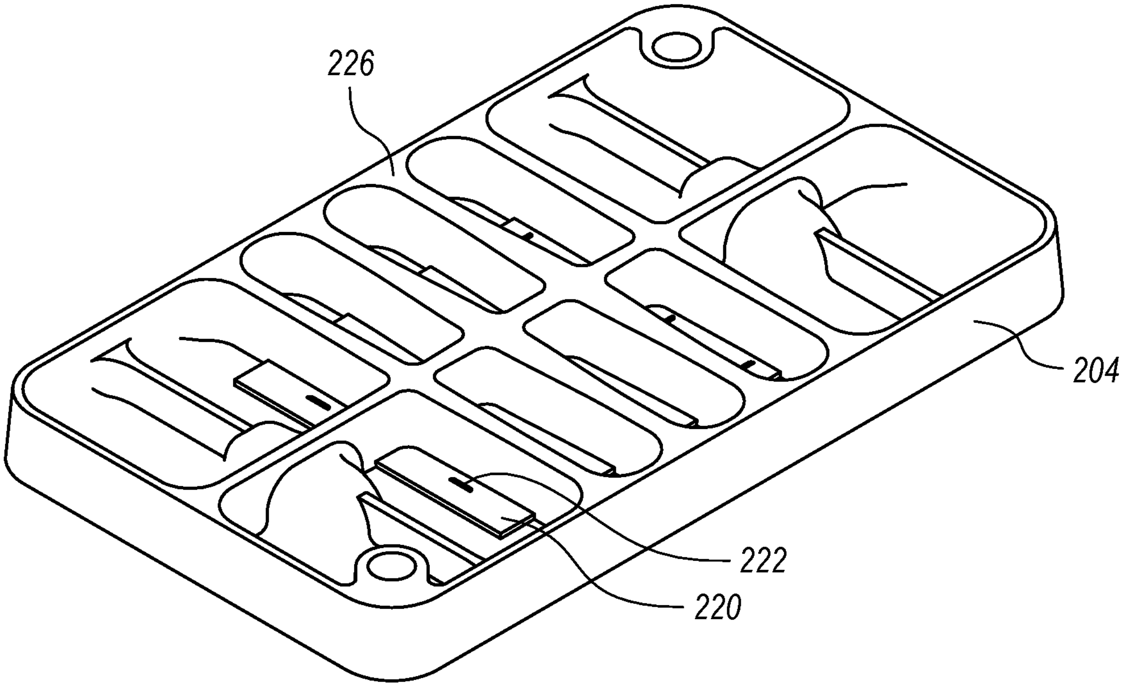
FIG. 11 shows a view of the underside of the alternative embodiment of the lid with plurality of integrated receiving slots of FIG. 10.
Figure 12:
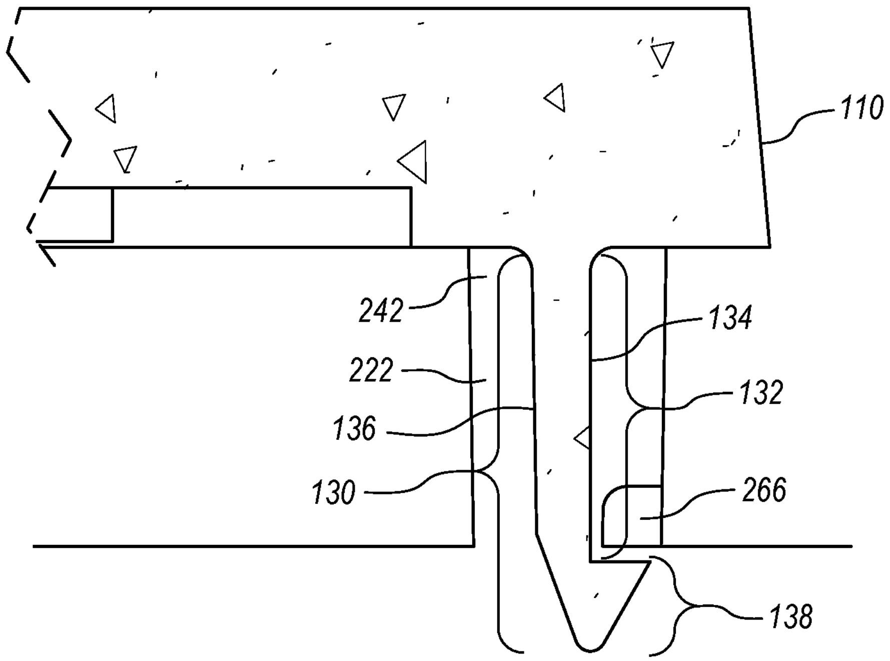
FIG. 12 shows a cross-section of an example embodiment of one of the plurality of integrated receiving slots of FIGS. 10 and 11 with a cantilever arm of a nameplate inserted into the integrated receiving slot.

FIGS. 10, 11, and 12 illustrate an alternative example embodiment of a lid 204 for utility access box 102 (FIG. 1). FIG. 10 shows top side 224 of lid 204 for a utility access box 102. FIG. 11 shows an underside 226 of lid 204 for utility access box 102. In this embodiment, lid 204 comprises a plurality of integrated receiving slots 222 wherein each receiving slot 222 can receive one of the plurality of cantilever arms 130 of nameplate 110 (FIG. 9) to affix nameplate 110 to lid 204. Integrated receiving slots 222 are formed directly in lid 204.

As shown in FIG. 12, each integrated receiving slot 222 comprises a first opening 242 and a first snap tab 266. Hook 138 clips past first snap tab 266 into first opening 242 in receiving slot 222 in lid 204 (FIGS. 10 and 11) to form a cantilever snap joint.

Nameplate 110 may be affixed to lid 204 using the plurality of cantilever arms 130 without the use of glue, adhesive, screws, bolts, or other fasteners separate from nameplate 110.

Forming the plurality of integrated receiving slots 222 directly in lid 204 for utility access box 102 at the time of manufacture of lid 204 eliminates the need for a separate receiver.

What is claimed is:

1. A labeling assembly for a lid for a utility access box comprising:
- a nameplate comprising a plurality of cantilever arms;
- a receiver comprising:
  - a top side;
  - an underside; and
  - a plurality of receiving slots in the top side of the receiver, wherein each of the plurality of receiving slots comprises:
    - a first receiver opening; and
    - a first snap tab;
  - a spine;
  - a plurality of receiver arms;
  - a plurality of body cavities;
  - wherein the plurality of receiver arms extend from the spine;
- wherein the receiver is cast into a lid for a utility access box;
- wherein each of the plurality of cantilever arms of the nameplate is configured to clip into the plurality of receiving slots in the top side of the receiver to affix the nameplate to the lid; and
- wherein a material forming the lid fills the plurality of body cavities of the receiver during casting to bond the receiver to the lid.

2. A labeling assembly for a lid for a utility access box comprising:
- a nameplate comprising:
  - a plurality of cantilever arms;
  - an interior portion;
  - a border around a perimeter of the interior portion;
  - a plurality of support bosses located in the interior portion; and
  - wherein the border of the nameplate is thicker than at least a portion of the interior portion of the nameplate;
- a receiver comprising:
  - a top side;
  - an underside; and
  - a plurality of receiving slots in the top side of the receiver, wherein each of the plurality of receiving slots comprises:
    - a first receiver opening; and
    - a first snap tab;
- wherein the receiver is cast into a lid for a utility access box; and
- wherein the plurality of cantilever arms of the nameplate clip into the plurality of receiving slots in the top side of the receiver to affix the nameplate to the lid.

3. A labeling assembly for a lid for a utility access box comprising:
- a nameplate comprising a plurality of cantilever arms;
- a receiver comprising:
  - a top side;
  - an underside; and
  - a plurality of receiving slots in the top side of the receiver, wherein each of the plurality of receiving slots comprises:
    - a first receiver opening; and
    - a first snap tab;
- a receiver plug;

a second receiver opening in each of the plurality of receiving slots on the underside of the receiver;

wherein the receiver is cast into a lid for a utility access box;

wherein each of the plurality of cantilever arms of the nameplate is configured to clip into the plurality of receiving slots in the top side of the receiver to affix the nameplate to the lid; and wherein the receiver plug is configured to clip into the second receiver opening.

4. The labeling assembly of claim 3 wherein the receiver plug further comprises:

a base;

a plug cantilever arm comprising:

a first side; and a second side;

a plug hook extending from the first side of the plug cantilever arm for clipping the plug hook past the second snap tab in one of the plurality of receiving slots; and wherein the base covers the second receiver opening.

5. A labeling assembly for a lid for a utility access box comprising:

a nameplate comprising:

a plurality of cantilever arms;

an interior portion;

a border around a perimeter of the interior portion;

a plurality of support bosses located in the interior portion;

a lid comprising:

a top side;

an underside; and a plurality of integrated receiving slots in the top side of the lid, wherein each of the plurality of receiving slots comprises:

a first opening; and a first snap tab;

wherein each of the plurality of cantilever arms of the nameplate is configured to clip into one of the plurality of integrated receiving slots on the top side of the lid to affix the nameplate to the lid; and wherein the border of the nameplate is thicker than at least a portion of the interior portion of the nameplate.

* * * * *